Figure 1:
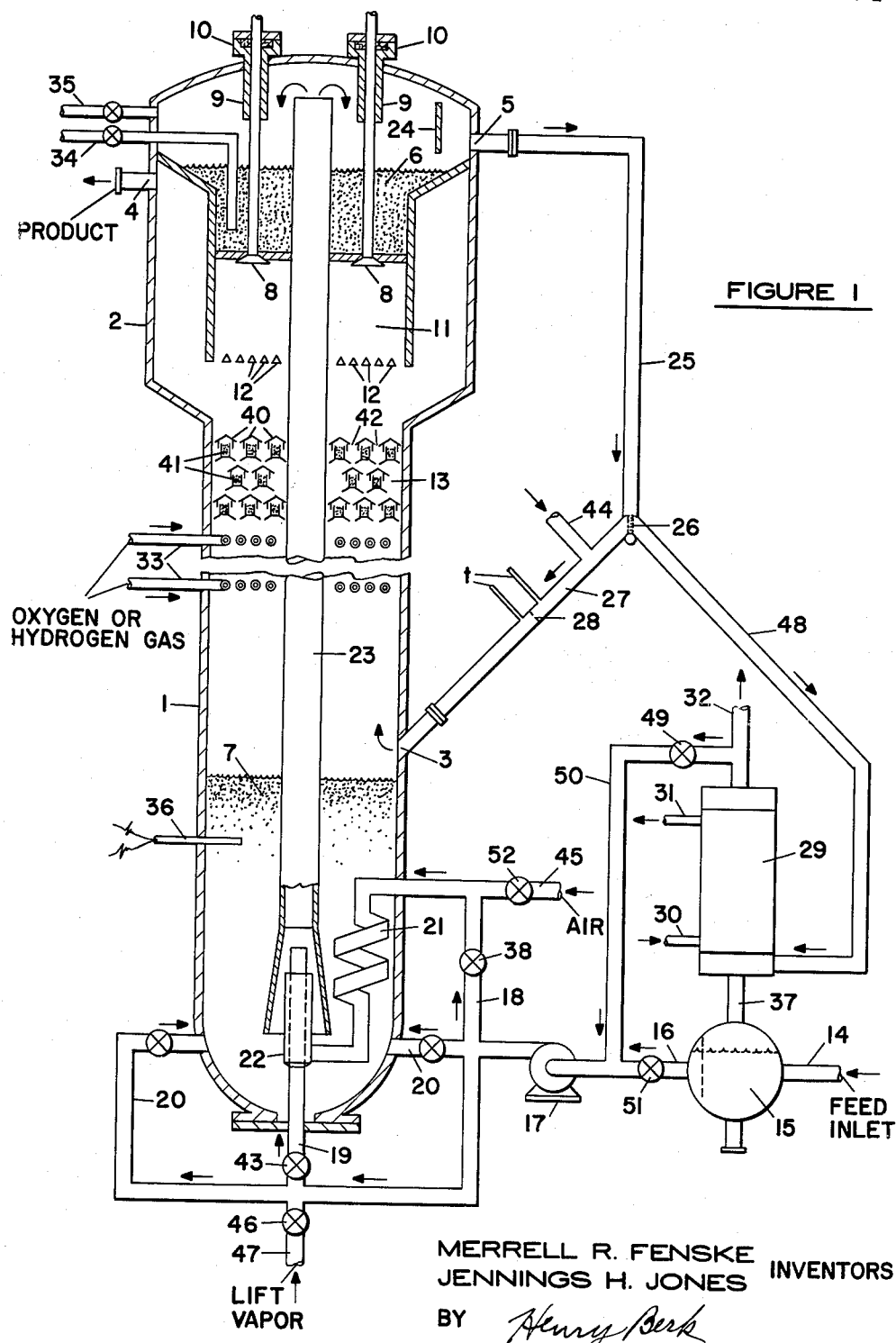

April 23, 1963 M. R. FENSKE ETAL 3,086,852
REACTOR FOR VAPOR PHASE CATALYTIC CONVERSION
Filed March 27, 1958 3 Sheets-Sheet 1

MERRELL R. FENSKE
JENNINGS H. JONES INVENTORS

BY Henry Berk

ATTORNEY

April 23, 1963     M. R. FENSKE ETAL     3,086,852
REACTOR FOR VAPOR PHASE CATALYTIC CONVERSION
Filed March 27, 1958     3 Sheets-Sheet 2
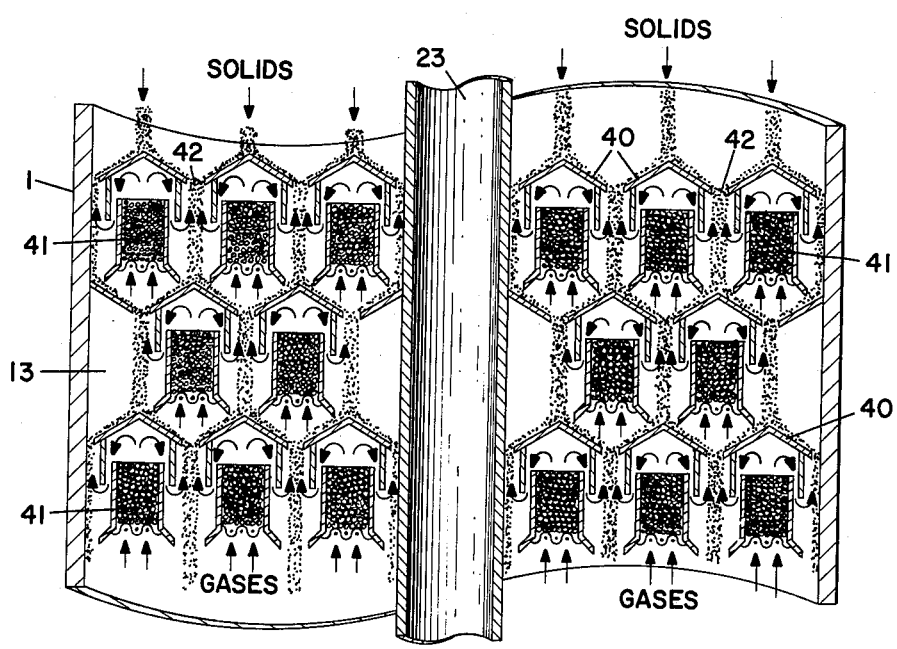
FIGURE 2

April 23, 1963    M. R. FENSKE ETAL    3,086,852
REACTOR FOR VAPOR PHASE CATALYTIC CONVERSION
Filed March 27, 1958      3 Sheets-Sheet 3

MERRELL R. FENSKE
JENNINGS H. JONES    INVENTORS

BY    *Henry Berk*    ATTORNEY

United States Patent Office 3,086,852
Patented Apr. 23, 1963

3,086,852
REACTOR FOR VAPOR PHASE CATALYTIC
CONVERSION
Merrell R. Fenske and Jennings H. Jones, State College, Pa., assignors to Esso Research and Engineering Company, a corporation of Delaware
Filed Mar. 27, 1958, Ser. No. 724,427
4 Claims. (Cl. 23—288)

This invention is concerned with vapor phase catalytic reactions having a substantial heat effect, either exothermic or endothermic. The process and apparatus are useful in producing new chemicals and fuels by oxidation, chlorination, hydrogenation, dehydrogenation, and others.

More particularly this invention is concerned with the use of a stream of dispersed particulate solids to add or remove reaction heat. These highly dispersed solids flow through zones of catalytic materials wherein the chemical conversion occurs. The catalytic zones may be in the form of clusters of solid particles or in the form of screens, gauzes, wires, metal strips, or the like. The purpose of the dispersed solids is either to remove heat from, or to supply heat to, the reaction zone by means of intimate contact with the reaction vapors and the resulting excellent heat transfer between the solid and vapor streams.

In many vapor phase catalytic conversion processes there is a substantial heat effect. In the case of exothermic reactions, such as oxidations, hydrogenations, and halogenations, this reaction heat must be removed to avoid runaway reactions and loss in selectivity. In the case of endothermic reactions such as in dehydrogenation and hydrocarbon cracking, the reaction heat must be provided to prevent the reaction from slowing down, thereby adversely affecting conversion and selectivity.

Heretofore providing or removing reaction heat to or from the fixed bed conversion zone has been difficult. In some cases it has been done by placing the catalyst in tubes, the outside of which are heated or cooled; in other cases conversion is carried out in an adiabatic-type catalytic bed, the gases being removed from the bed, heated or cooled, and then passed through another adiabatic catalytic bed, etc.; in cases of highly exothermic reactions, an inert liquid, water for example, is sprayed into the reacting vapors to pick up the reaction heat.

One object of the present invention is to provide a better and entirely different method of handling the reaction heat and thus enable more and newer types of catalytic conversion processes to be used commercially. The method disclosed herein is substantially better than prior means for removing or adding heat to fixed catalytic surfaces within the reaction zone because the heat modification is performed by heat carrying solid particles without moving the catalyst or subjecting it to attrition. This is especially important when the catalyst is one such as platinum with poor attrition resistance.

The present invention may be conducted in a transfer line type of reactor either using co-current or counter-current flow of solids and reactants. However, in a preferred embodiment of the invention the catalytic solids in the form of particles, coils, wires, gauzes, meshes, screens, or strips, are arranged in clusters spaced apart in horizontal rows. These rows may be stacked one above the other in alternate fashion so that in an intermediate row a cluster is above and below a space between clusters in the two adjacent rows. Between these fixed catalyst clusters dispersed solids descend under essentially free-fall conditions although this fall can be impeded by grids or screens. The spaces between clusters form a channel through which the raining solids fall and adsorb or add reaction heat. Each of the clusters, however, may be shielded by baffles so that the freely falling solids cannot contact the clusters of catalyst surfaces thereby subjecting the catalyst to undesired impingement by the solids.

These baffles serve not only to funnel the downfalling solids into proper channels and partition them throughout the catalyst zone, but also to direct the upflowing vapors after contact and reaction from the catalyst surface to the heat exchange space between catalyst clusters.

The vapors pass alternately into contact with surfaces of catalyst in a cluster and then immediately through the heat exchange space between clusters. Therefore, the vapors undergo reaction, immediate cooling or heating, reaction again, and so forth until they pass up through enlarged section 2, FIG. 1, and out via line 4 to a conventional recovery system.

These baffles may be shaped like roofs, hemispheres, or any other shape to direct the solids and vapors into proper areas. The baffling means may also include funnel-shaped baffles to disperse the solids throughout the catalyst zone. The solids are divided or partitioned by the roof-shaped baffles, dispersed horizontally as they fall vertically, and then collected by the funnel-shaped baffles, to be redispersed by more roof-shaped baffles. This baffling means provides a mechanism for better heat distribution throughout the catalyst zone since no one group of heat carrier solids remains in one area of the catalyst zone long enough to cause hot or cool areas.

This continuous alternate reaction temperature control process facilitated by the staggered arrangement of fixed catalyst clusters along with control of temperature between narrow limits by the downfalling well distributed particulate solids produce large yields of the desired product with less formation of unwanted products which result from over-reaction or fluctuating temperatures.

The process can be used at any temperature and pressure permitted by appropriate materials of construction. It is best adapted to reactions with substantial heat effects that occur in the gaseous phase over catalytic surfaces. The temperatures are usually in the range of about 300° to 1500° F. and pressures up to about 500 p.s.i.g.

The raining solids used to regulate reaction temperature may be siliceous or aluminiferous materials such as Ottawa sand, glass beads, clays, quartz, fused alumina, zirconia, fused carbon, mullite, and other similar substances. These solids are preferably inert toward the reactants and reaction products. However, the raining solids may have catalytic properties towards the reactants or products and thus be used in conjunction with the fixed catalyst clusters. For example, the raining solids may have cracking properties and the fixed catalyst clusters oxidation properties toward the hydrocarbons.

In general the size and shape of the raining solids are such that they can be readily fluidized and separated from the vapors by cyclones. They should have good attrition resistance and not be easily entrained by vapors. The properties of some suitable solids are in Table 1.

TABLE 1

*Physical Properties of Granular Solids*

| Material | Average Particle Diameter (Microns) | Particle Density (Lb./Ft.³) | Settled Bed Density (Lb./Ft.³) | Fraction Free Space (Settled Bed) | Free Fall Velocity [1] (Ft./Sec.) | Fluidization Velocity [2] (Ft./Sec.) | Specific Heat of Particle,[3] B.t.u./ Lb., °F. |
|---|---|---|---|---|---|---|---|
| Carbon powder | 35 | 63 | 34 | 0.47 | 0.12 | Approx. 1/20 of the Free Fall Velocity. | 0.18 |
| Microspheres | 62 | 90 | 49 | 0.46 | 0.5 | | 0.23 |
| Glass Spheres | 104 | 170 | 104 | 0.38 | 2.0 | | 0.20 |
| Alumina (Al₂O₃) | 125 | 230 | 114 | 0.51 | 3.0 | | 0.18 |
| Glass Spheres | 308 | 176 | 110 | 0.38 | 8.0 | | 0.20 |
| Carbon Granules | 550 | 63 | 32 | 0.49 | 7.5 | | 0.18 |
| Glass Spheres | 600 | 176 | 110 | 0.38 | 15 | | 0.20 |
| Carbon Granules | 1,200 to 2,400 | 63 | 33 | 0.48 | 21 | | 0.18 |

[1] At 70° F. and 750 mm. Hg in air.
[2] These velocities are near the minimum values required for incipient fluidization with air at 70° F. and 750 mm. Hg.
[3] 20° C. to 100° C.

The size of the raining particles usually ranges from about 50 to 800 microns, preferably about 100 to 300 microns because such particles show good fluidizing and flow characteristics as well as little tendency toward entrainment in gases. When these solids are in essentially free-fall conditions, the free space excluding the catalyst clusters is upwards of 95% or more. Even though 10 to 50 pounds of solids per pound of reactants are freely falling, the reaction space between the fixed clusters may still be 90% or more voids.

A cross-sectional elevation view of a preferred apparatus for carrying out these catalytic conversions is shown in FIGURE 1. FIGURE 2 is an enlargement of a portion of the interior of the reaction vessel depicted in FIGURE 1 with added detail to show how the down-flowing solids are contacted with the upflowing gaseous reactants in the spaces between fixed catalyst surfaces.

The reactor in FIGURE 1 is a vertical cylindrical shell 1 with an expanded top 2 fabricated to withstand temperatures up to about 1000° and pressures up to about 100 p.s.i. It is provided with openings 3, 4 and 5. In the upper part of the expanded section 2 there is a fluidized or partially fluidized bed 6 of inert solids and a similar bed of the same fluidized solids in the lower bed 7. The amounts of solids leaving upper bed 6 is metered by valves 8 sliding in valve guides 9 and sealed by stuffing boxes 10. The solids flow downward under essentially free-fall conditions into space 11 and then into catalyst zone 13. These falling or "raining" solids impinge on grid 12 which serves to break up clusters of the solids and disperse them still more so they are able to fall in a highly dispersed and uniformly distributed manner through the catalyst zone 13. The solids are gathered together at the bottom of the reactor to comprise bed 7.

The solids are then lifted from bed 7 to bed 6 by vapors which may be either hydrocarbon feed vapors or inert vapors such as steam or nitrogen. They enter as a vapor or liquid via valve 43 and line 19 or line 18, valve 38 and coil 21. If liquid, they are vaporized in coil 21 or nozzle 22 by the hot solids passing up through pipe 23. The vapors serve to heat or cool the solids in lift pipe 23 as well as to transport them up the pipe. The vapors then pass out through exit 5.

At the top of pipe 23 the solids are disengaged from the lift vapor and fall freely downward to constitute bed 6. The vapors emerging from the top of pipe 23 flow around baffle 24 and out through opening 5. A high degree of separation efficiency is usually not necessary since both the solids and the vapors eventually pass from the top of the reactor into catalyst zone 13. However, a cyclone may be used if desired to separate any entrained solids from the vapors leaving through pipe 5. Although FIGURE 1 shows a bed of solids at the bottom of the reactor and an internal riser pipe, it is to be understood that other means for transporting the finely divided solids to the top of the reactor may be employed. These other means may or may not require maintaining a solids bed at the bottom of the reactor.

From about 2–100 pounds of solids flow downward through the reaction zone per pound of hydrocarbon feed. This ratio depends on the nature and speed of the reaction and the extent of the conversion desired. The level of bed 6 is controlled by sensing pipes 34 and 35. This level is kept substantially fixed by introducing a small amount of inert gas continuously into these pipes. The difference in gas pressure between pipes 34 and 35 is proportional to the depth of solids in bed 6. If the bed exceeds the desired depth, the increased gas pressure in pipe 34 operates a pilot valve which in turn operates conventional pneumatic or hydraulic cylinder, not shown, attached to the upper end of valves 8 to move them up and down.

Oxygen in the case of oxidation, or hydrogen in the case of dehydrogenation, enters pipes 33 which are placed from 1 to 5 feet apart along the vertical length of the catalyst zone 13. These pipes comprise substantially uniplanar coils and have a large number of holes on their undersides so the gaseous oxygen or hydrogen can be distributed uniformly throughout the whole cross-section of vessel 1. These coils 33 also serve to redisperse and redistribute the descending, dispersed solids. Thus, the solids in their flow from bed 6 to bed 7 are falling in part under free-fall and in part under restricted fall conditions. The staggered positions of the catalyst zones permit better mixing of the gas and solids. The term "free-fall" is employed herein to include particles falling in a zone containing rising vapors as well as descending vapors. While the rising vapors may slow down the fall rate of the solids, it is intended that this condition be included in the definition of the term "essentially free-fall."

Multiple oxygen or hydrogen injection is used to control the reaction further. Oxygen or hydrogen gas is added in relatively small increments so it can react and the reaction heat can be absorbed by the solids before the next increment of gas is added.

In one embodiment the vaporous reaction products flow upward through enlarged section 2 where the gas velocity is decreased to allow entrained solids to drop back into chamber 1. The products then flow out via line 4 to a recovery system where they are recovered in the conventional manner.

In another embodiment the gas may be made to flow downwardly by obvious techniques in which case there will be co-current flow of solids and gas.

In the first embodiment of the invention, as illustrated by the oxidation of orthoxylene in Example 1, the orthoxylene or other material to be oxidized enters as a liquid through feedline 14, flows through tank 15, and out via valve 51, line 16, and metering pump 17 for introduction into reaction chamber 1 via lines 18, 19 and 20. The feed flowing through lines 19 and 20 is introduced into the reactor essentially as a liquid at or near its boiling point. The portion of the feed flowing through line 18 becomes vaporized by coil 21. Liquid and vaporized material passing respectively through line 19 and coil 21 flows in any desirable proportion through nozzle 22 and then upward through solids lift pipe 23. Pipe 23 is desirably flared at the bottom to facilitate the inflow of fluidized solids at its base. The feedstock emerging from nozzle 22, partly in liquid and partly in vapor form, lifts the hot solids from bed 7 up through pipe 23 while the liquid feed normally becomes vaporized in the process.

The hot fluidized solids entering the flared base of pipe 23 vaporize any liquid feed introduced via line 19. In this way the solids are cooled and the necessary vapors are generated to propel the solids up through lift pipe 23. Nozzle 22 serves to aspirate the solids in the base of pipe 23. Vapors leaving outlet 5 pass down through pipe 25 to valve 26. This diverts part of the vapors into line 27 which connects with opening 3 and part through line 48. Vapors in line 48 may flow into heat exchanger 29, where they are condensed by a coolant such as water entering at 30 and leaving at 31. Other means for preheating the feed may be employed if desired. Inerts or any non-condensable gases are passed off through line 32. Valve 49 is closed and the condensate formed in heat exchanger 29 flows downward through pipe 37 into vessel 15 where it is mixed with the fresh feed entering line 14.

The vapors to be oxidized which are diverted to line 27 flow past orifice meter 28 which communicates with pressure taps $t$. These vapors enter the reaction vessel 1 at inlet 3 and flow upward through catalyst zone 13. Orifice 28 in line 27 measures and controls the rate at which the feed flows into opening 3 and thence into catalyst zone 13. This is the standard type of flow-meter whose pressure taps communicate with a suitable instrument, not shown, which positions valve 26. Feed vapors in excess of that required by flow-meter 28 are diverted by valve 26 and line 48 to heat exchanger 29. The oxygen or hydrogen gas fed to coils 33 is likewise controlled to set the overall gas to hydrocarbon mole ratio. The temperature of the solids falling through the catalyst zone 13 must be high enough so as not to quench the reaction, that is about 50° F. above the initiation temperature, but no higher so as not to form undesired products caused by excessively high temperatures. The temperature of lower bed 7 is measured by thermocouple 36. This thermocouple controls the rate at which hydrocarbon is pumped out of vessel 15 into chamber 1 by pump 17. When the reaction is exothermic as in Example 1, bed 7 is at a temperature about 50–150° F. above that of bed 6. If bed 7 rises in temperature above the desired control point, more hydrocarbon is introduced into nozzle 22. More hydrocarbon vaporization cools bed 7 and transports more solids into bed 6. This serves to increase the amount of solids per unit time and per unit of feed that rains down through catalyst zone 13. In operation, the rising vapors at least in part pass through the catalyst clusters 41, diverted by shield 40 the vapors then pass into the temperature control zone at 42. The amount of vapors passing through the catalyst clusters can be controlled by controlling the resistance or pressure difference between the clusters and temperature control zone. Loosely packed catalyst will have very little resistance to the rising vapors.

In a second embodiment of the invention, as illustrated by Examples 2–5, the hydrocarbon feed is introduced via pipe 44 into line 27. Valve 26 closes off line 27 from line 25 entirely and the gases leaving via opening 5 through line 25 are completely diverted into line 48 by valve 26. Hydrogen or oxygen is either introduced via pipe 44 along with the hydrocarbon or via coils 33 or both. The system comprising lines 25, 48, 50, 18, 19, 20 and 21, as well as heat exchanger 29, vessel 15 and pump 17 is used to heat or cool and transport the lift vapors which are inert gases such as nitrogen or steam.

Heat exchanger 29 heats the vapors in the case of endothermic reactions so that their temperature in line 50 is about 100° to 400° F. above that in line 48. In the case of exothermic reactions, heat exchanger 29 cools the vapors or condenses them. Any non-condensables pass out line 32. Valve 49 is open, and after the vapors have been heated, cooled, or condensed, they pass through line 50, pump 17, and into lift pipe 23 via lines 18, 19 and coil 21. Any liquid entering via lines 19 and 22 is vaporized by contact with the hot fluidized solids. Some vapors are introduced via line 20 to fluidize bed 7. Additional lift gas such as superheated steam for transporting the solids through pipe 23 can be introduced through line 47, valve 46, line 19, and valve 43.

In dehydrogenation reactions as in Example 2, instead of supplying the heat indirectly by heat exchanger 29, the heat may be generated directly in lift line 23. In this case the lift gas is nitrogen flowing via lines 16 and 19. Some hydrogen or hydrocarbon is introduced via line 47, valve 46, line 19, and valve 43 into nozzle 22. Some air is introduced via line 45 and valve 52 and preheated in coil 21 from which it enters nozzle 22. Therefore, valve 38 is closed. In this case the hydrogen and oxygen burn to generate heat which heats the solids while they are being transported from bed 7 to bed 6. Care must be exercised to avoid explosive mixtures. The water vapor and nitrogen pass out through line 5 and return through line 16 and pump 17 to complete the cycle.

Figure 3:
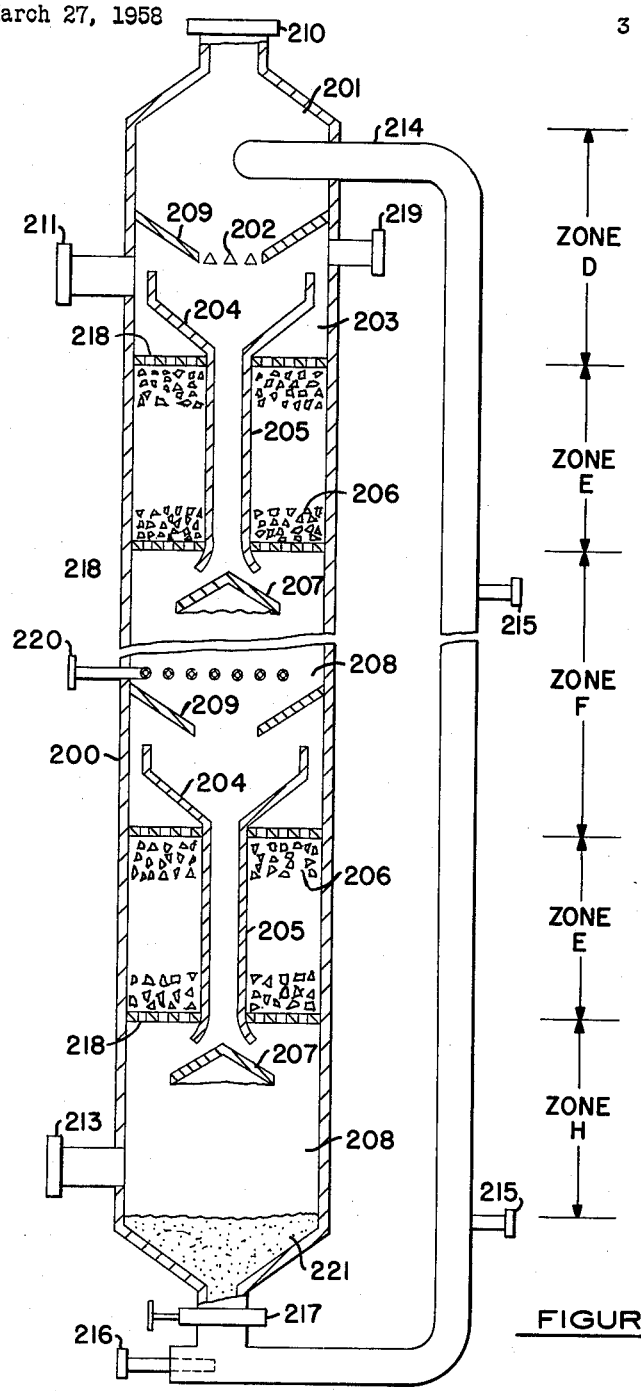

Another embodiment is shown in FIGURE 3 which portrays another type of reactor where a stream of descending solids can be employed along with a plurality of fixed catalytic beds or zones to carry out, on one vessel, catalytic reactions that have substantial heat effects, either endothermic or exothermic. FIGURE 3 contains, for purposes of illustration, zones D, E, F and H.

Zone D contains a cyclone, or other gas-solid disengaging means, for separating the gas-solid mixture flowing upward in lift line 214. It also contains an inclined bottom 209, part of which is covered by a grid or screen structure 202 to enable particulate solids to flow through the openings in grid 202. Depending on the type of operation desired, there may or may not be a dense fluidized bed of solids retained above 209 and 202.

Zone E contains a fixed bed of catalyst 206, held between grids or screens 218. Pipe 205 for transporting the flowing solids through bed 206 is expanded at its upper end into a funnel-shaped section 204 which serves to catch the solids descending through grid 202 and direct them into pipe 205, which is flared at its bottom end to distribute the flowing or raining solids over distributor 207 so that these solids are well distributed through space 208. The catalyst in bed 206 may be in the form of regular shapes such as cylinders, rods, or spheres, or it may be in irregular shapes such as those formed by crushing. The size and arrangement of the fixed bed is such that there is good gas-solids contacting with a minimum of pressure drop through bed 206.

Zone F is a temperature-conditioning zone. The particulate solids rain down through space 208 in a well distributed and dispersed form and contact the vapors and gases present in space 208, which may be flowing co-current or countercurrent to the descending dispersed solids, as will be illustrated later. It is the purpose of zones F to bring the vapors, or reactants, to the proper temperature before the chemical transformation, or reaction, occurs in fixed bed zones E. In other words, chemical changes occur in zones E and physical changes, primarily temperature changes, occur principally in zones F. Thus if an exothermic reaction occurs in zones E, such as in vapor phase oxidations or halogenations, the excess heat is removed from the vapors by transference to the raining solids in zones F, before the vapors enter another zone E for chemical transformations. In the case of an endothermic reaction, such as dehydrogenation, zone F serves to bring the reacting vapors up to the proper temperature before these enter another catalytic zone E. The flowing particulate solids are, therefore, a heat sink. Because of the amount flowing, their specific heat, and their good heat transfer characteristics with the vapors, these flowing solids either add or remove heat to enable catalyst zones E to operate at their maximum efficiency and selectivity. From about 5 to 30 pounds of these solids flow downward through reactor 200 per pound of reacting vapors.

Zone H, positioned at the bottom or lower part of reactor 200, functions similar to zones F. A highly dispersed rain of particulate solids descends through zone H to temperature-condition the vapors in space 208. These solids accumulate as a dense bed 221.

Slide valve 217 regulates the outward flow of solids from bed 221. The solids passing through valve 217 are propelled upward through line 214 by gas or vapor jet 216 in the manner already described in FIGURE 1.

As the solids are propelled through line 214, they may be heated, cooled, or stripped by a fluid introduced via openings 215. For example, if the propelling gas contains a combustible component, then air or oxygen may be introduced via openings 215 to heat the solids as they are being returned to space 201. If the solids are to be cooled, then steam or a water spray may be introduced through 215. If the solids are to be stripped of adsorbed components, then a suitable stripping gas, in addition to that introduced via nozzle 216, may be fed in via openings 215. Such stripping gas may be steam, or an inert material such as a low molecular weight hydrocarbon, or an inert like nitrogen.

The vapors, or materials to undergo chemical transformation in reactor 200, may flow co-current or countercurrent to the stream of particulate solids descending in reactor 200.

When countercurrent operation is used, the vapors or reactants enter via opening 213. They are temperature-conditioned in zone H by the falling particulate solids. Because of the arrangement of deflector or distributor 207 and its proximity to the flared lower section of pipe 205, these vapors have little tendency to flow upward and countercurrent to the stream of dense solids descending in pipe 205. Instead, they flow up through grid 218, which is the support for the fixed catalyst beds 206 in zones E. After passing through the lowest bed 206, the temperature of the vapors will be either higher or lower than that which prevailed prior to the vapors meeting bed 206. This will depend on whether the reaction in bed 206 is exothermic or endothermic, for bed 206 operates in essentially an adiabatic manner.

In space 208 and zone F the vapors rise through the descending dispersed stream of particulate solids to regain the temperature best suited for efficient operation in the next catalytic bed 206. The vapors are temperature-conditioned by virtue of their intimate contact with the dispersed solids of high heat capacity.

The vapors in their upward passage through reactor 200 thus pass alternately through several temperature-conditioning (zones F) and fixed bed catalytic zones (zones E). They leave reactor 200 via opening 211 to go to a recovery system to be further refined or separated into the desired products, if a dense bed of particulate solids is confined above grid 202.

If a dense bed of solids is not maintained above grid 202, the vapors pass up through space 203, through grid 202, into space 201 and out via opening 210. In this case the vapors mix with the lift gases used in pipe 214. Openings 211 and 219 are closed.

In the co-current operation, a dense bed of solids is maintained above grid 202 of such a depth that the vapors to undergo reaction, and which are introduced via opening 211, are forced to pass downward through the upper catalytic zone 206. If desired, all or a part of one of the reactants may also enter via 219. These vapors pass through space 203 and thence downward through zone E, or catalyst bed 206. These vapors leave the bottom of catalytic bed 206 and flow downward and co-current with the dispersed particulate solids in zones F, where they are temperature-conditioned prior to entering another fixed bed catalytic zone E. This process of alternately flowing through zones E and F is continued for a sufficient period to attain the desired conversion of the feed, which entered via opening 211.

In space 208, zone H, the reacted vapors and the dispersed solids are separated. The vapors pass out via 213 to a suitable recovery system. The solids accumulate as a dense bed 221. From here they are recycled via pipe 214 and nozzle 216 to the top of reactor 200, as before.

If desired, additional quantities of one or more of the reactants may be introduced periodically via opening inlet 220. Several of these may be positioned along the length of reactor 200.

Some specific applications of the invention are described in the examples, but it should be understood that the invention is not limited to the specific systems or conditions set forth since numerous modifications and alternative procedures and conditions will be apparent to those skilled in the art from the above description.

EXAMPLE 1

*The Vapor Phase Oxidation of Orthoxylene to Phthalic Anhydride*

In this oxidation the apparatus is used as described in the first embodiment of the invention. The orthoxylene, made up of about 90% of orthoxylene and the remainder meta and para isomers, enters as a liquid into feed inlet 14 and then proceeds through tank 15, line 16, valve 51, pump 17 and into the reaction vessel 1 via lines 18, 19 and 20. The oxygen enters as a gas through coils 33. The oxygen to hydrocarbon weight ratio is maintained in the range from about .5 to 3.0, preferably 1 to 1.5. The products consisting of more than 60% phthalic anhydride along with some maleic anhydride, carbon monoxide, and carbon dioxide exit via opening 4 to a conventional recovery system.

Xylene vapors used in lift pipe 23 leave through opening 5 and pass down through line 25 where part is diverted by valve 26 into line 27 for re-entry into the reaction chamber via opening 3, and part to line 48 where the gas is condensed in heat exchanger 29 and transferred to tank 15 via line 37 for mixing with the incoming feed.

The raining solids in this oxidation are fine alumina or mullite in the range of about 100–300 microns. The catalyst, vanadium pentoxide, is contained in wire baskets of about 2–6" in diameter and 6–30" long. The temperature in the catalyst zone ranges from about 650–1000° F., preferably 700–850° F., and the pressure is from 1–3 atmospheres. Since the reaction is strongly exothermic, the raining solids serve to remove reaction heat which is shown by a rise in solids temperature. The catalyst zone therefore is about 50–150° hotter than bed 6, the temperature in bed 6 varying from about 650–900° F.

EXAMPLE 2

*The Vapor Phase Dehydrogenation of Hydrocarbons*

This example along with the following three illustrate the second embodiment of the invention. Naphthenes for dehydrogenation such as cyclohexane and methylcyclohexane enter at line 44, FIG. 1. Part of the hydrogen gas enters with the hydrocarbon at 44, the remainder being piped in through line 47. The products which are aromatics such as benzene and toluene pass out through line 4 to a recovery system. Since this reaction is endothermic, heat exchanger 29 is used to heat inert gases such as steam or nitrogen so that their temperature in line 50 is about 100° greater than that in line 48. These inert gases flow through line 50, valve 49, pump 17, valve 43, line 19, and up through nozzle 22 and lift pipe 23 wherein they heat and lift the solids from bed 7 to bed 6.

The solids can be fused alumina, quartz, sand or dense carbon from about 100–500 microns in size. They may also have catalytic properties such as magnesium or aluminum silicates which have cracking properties. The catalyst is platinum on alumina contained in wire baskets of about 2–6″ in diameter and 6–30″ long. The reaction temperature in the catalyst zone is about 900–1000° F. and the pressure from 50–600 p.s.i.g. Since the solids are used here to introduce heat to the reaction, bed 6 must be 25 to 150° higher in temperature than catalyst zone 13.

The raining solids can be used to provide heat to catalyst zone 13 in one part of the cycle and remove heat from it in another part of the cycle. Carbon ultimately deposits on the catalyst impairing its activity. While the dehydrogenation reaction is in progress, the raining solids are furnishing heat to catalyst zone 13. When it becomes necessary to reactivate the catalyst in beds 41 by burning off the carbon with an oxygen-containing gas, the raining solids then operate to pick up this heat of combustion and prevent excessive temperatures from harming the catalyst.

EXAMPLE 3

*The Oxidation of an Alcohol Such as Methanol to an Aldehyde Such as Formaldehyde*

The apparatus used in this oxidation is a form of the second embodiment of this invention. The methanol feed enters at 44, and valve 26 completely closes off line 27. The oxygen, or oxygen-containing gas, such as air, enters through coil 33. The products containing mostly formaldehyde along with hydrogen, carbon monoxide, carbon dioxide, water, methanol, and nitrogen gas pass out line 4 to a conventional water scrubbing process to recover the formaldehyde and methanol. The vaporization of water may be used to cool the solids at the base of lift-pipe 23. The steam then flows up and out exit 5 through pipe 25 and 48 to heat exchanger 29 where it is condensed and re-used. Additional steam, if desired, for transporting solids through pipe 23 is introduced from line 47, valve 46, line 19, and valve 43. Methanol vaporization may also be used to cool and transfer the solids. Steam or methanol vapors are introduced from lines 20 and 21 to fluidize bed 7.

The solids used may be sand, quartz, or dense carbon of about 100–500 microns in size. The catalyst consists of layers of silver and copper gauze. This reaction can be either exothermic or endothermic depending on the ratio of oxygen to methanol. Therefore bed 6 is either cooler or hotter than catalyst zone 13, depending on whether the reaction is exothermic or endothermic. The reaction temperature is in the range of about 800–1100° F. and the pressure is atmospheric.

EXAMPLE 4

*The Catalytic Oxidation of Gaseous Hydrogen Chloride by Oxygen to Produce Chlorine and Water*

This oxidation is similar in most respects to the oxidation of methanol except that this reaction is always exothermic. The hydrogen chloride enters as a gas into line 44 and again valve 26 closes off line 27. The oxygen, or oxygen-containing gas such as air may be mixed with the hydrogen chloride when it enters at 44 or may be introduced into the reaction chamber via coils 33 or both. The products, chlorine and water, exit through opening 4. Heat exchanger 29 is used to condense steam which is vaporized in coil 21 and used to lift the solids through pipe 23 as well as to cool them.

The solids can be sand, quartz, or dense carbon of about 100–500 microns in size. The catalyst consists of chlorides of chromium, copper and iron on inert materials such as pumice, alumina or clay. Sometimes the catalyst is promoted with lead or alkaline metal halides. The reaction temperature is in the range of about 550–800° F. and the pressure 1–5 atmospheres. The temperature of bed 6 is about 25 to 150° F. cooler than catalyst zone 13.

EXAMPLE 5

*The Chlorination of Methane*

This reaction, too, is exothermic. The methane feed enters at line 44 with valve 26 closing off line 27. The gaseous chlorine may enter either at coils 33 or with the methane at line 44 or both. The product mixture, which is mostly carbon tetrachloride but also contains methyl chloride, methylene chloride and chloroform, passes out opening 4 to a conventional recovery system. In the manner described in the second embodiment of this invention either methane or water may be used to cool the solids in the lift pipe 23.

The solids used are quartz or sand of the 100–500 micron size range. The catalyst is carbon. The reaction temperature varies from about 450–750° F. and is carried on at about atmospheric pressure. Bed 6 is about 25 to 150° F. cooler than catalyst zone 13.

EXAMPLE 6

*The Oxidation of Ethylene to Ethylene Oxide*

For this oxidation instead of using the catalyst in the form of clusters and employing baffles to disperse and guide the falling solids around the catalyst clusters, an alternate procedure is preferred. Thus the catalyst in the form of wire gauze, thin strips of metal, coils, or screen having catalytic properties or coated with an active catalyst such as silver is inserted (either lengthwise or crosswise when in the form of gauze or wire screen) into the reaction zone in such a manner that the falling solids fall between the catalytic surfaces. The preferred distance between such strips of catalytic surfaces vary for the type of reaction being conducted and the contact time desired, but preferably are spaced about 1 to 2 centimeters apart. When ethylene is used as the feed, the reaction temperature is maintained at about 400 to 600° F., while the catalyst may be silver gauze or a specially prepared silver catalyst deposited on metal strips, gauze, coils, etc. The solids serve mainly to remove reaction heat and give close temperature control; however, they may also be coated with silver catalyst. While oxygen is the preferred oxidant when the above reaction is carried out at atmospheric pressure, air or other oxygen-containing gas also may be employed.

The following example illustrates the use of the apparatus shown in FIGURE 3.

EXAMPLE 7

This will illustrate the use of the reactor of FIGURE 3 in a dehydrogenation process, wherein a naphtha, or gasoline fraction, is reacted over a platinum on alumina catalyst in the presence of hydrogen to convert the naphthenes in the naphtha to aromatics. This conversion is an endothermic reaction. The reaction takes place at about 900° F. in an atmosphere of hydrogen. The pressures used in reactor 200 are in the range of 100 to 800 p.s.i. Several hundred cubic feet of hydrogen per barrel of naphtha feed are passed through the platinum catalyst, which is confined as pills, or rods, in beds 206. These fixed bed catalyst particles range usually from about ¼ to 1″ in size.

Naphtha to be dehydrogenated, along with hydrogen, enters via opening 213 and, in this example, these two substances pass upward and countercurrent to the descending stream of particulate solids. These flowing dispersed solids may be essentially inert toward the naphtha and the hydrogen. Examples are fused alumina, zircon silicate, mullite (fused silica-alumina), sand, or quartz in the particle size range of about 100–700 microns.

The flowing dispersed solids that intimately contact the naphtha vapors and hydrogen in zones E, may also have catalytic properties different from those present in the fixed bed catalytic zones E. In this instance, they may have dehydrogenation, isomerization, or hydro-cracking properties. Examples are aluminum or magnesium silicates, nickel on alumina, chromia-alumina, and cobalt molybdate.

These flowing solids must have reasonably good mechanical strength and resistance to attrition. The amounts circulated range from about 3 to 30 pounds per pound of naphtha feed.

In the lowest zone H, the naphtha and hydrogen are temperature-conditioned so as to be about 900° to 950° F. On passage through the lowest zone E dehydrogenation occurs and the temperature drops 20 to 50° F.

In zone F the dispersed descending particulate solid stream reheats the naphtha and hydrogen back to the optimum dehydrogenation temperature, i.e., 900° to 950° F. before they enter another fixed bed zone E. The number of zones E and F employed depends upon the type of naphtha, and the extent of conversion and degree of dehydrogenation desired. Usually there will be 3 or more of each of these zones in reactor 200.

The converted naphtha and hydrogen pass into space 203, up through open grids 202, through space 201 and exit via opening 210 to flow to a suitable recovery unit to separate the converted naphtha from the hydrogen.

Some of the hydrogen so separated is used, with or without added steam, in nozzle 216 to propel the particulate solids through pipe 214 to the top of reactor 200. These solids on their ascent may be heated by adding air or oxygen via inlets 215. Or the solids may be heated in a separate vessel, not shown, before they are returned to the top of reactor 200.

The advantages of this type of reactor are that expensive catalysts, such as platinum, or those that are very active but have poor attrition or handling resistance may be employed in fixed beds, as shown. Instead of using furnaces to reheat the naphtha or hydrogen between these zones E, the heat of reaction can be imparted successively in zones F. Thus the whole process of dehydrogenation is simplified, and made more flexible and versatile in view of the fact that the reactants can effectively be contacted with at least two types of surfaces. As indicated, these surfaces can be used to get readily the optimum combination of physical and chemical changes in one reactor.

What is claimed is:

1. In an apparatus for carrying out vapor phase catalytic conversions comprising a vertical reactor shell having feed inlets and a product outlet, upper and lower beds of inert finely divided solid heat exchange particles, means for discharging the particles from the upper bed and the lower bed in a falling condition, means for returning the fallen particles in the lower bed to the upper bed, means for adjusting the temperature of said fallen particles, and a reaction zone between said upper and lower beds, the improvement which comprises a plurality of fixed catalyst beds horizontally and vertically spaced apart in said reaction zone, and baffles which cover and support the catalyst beds and define substantially vertical zigzag shaped channels between said catalyst beds through which the particles fall from said upper bed to said lower bed and impinge on said baffles while falling through said channels, said catalyst beds being pervious to upwardly flowing vapors which enter and leave through apertures formed by the baffles which cover and support the catalyst beds.

2. In an apparatus for carrying out vapor phase catalytic conversions comprising a vertical reactor shell having feed inlets and a product outlet, upper and lower beds of inert finely divided solids heat exchange particles, means for discharging the particles from the upper bed and the lower bed in an essentially falling condition, means for returning the fallen particles in the lower bed to the upper bed, means for adjusting the temperature of said fallen particles, and a reaction zone between said upper and lower beds, the improvement which comprises a plurality of fixed catalyst beds located in said reaction zone, baffles which cover and support the catalyst beds and define substantially vertical zigzag shaped channels between the catalyst beds through which the particles fall from said upper bed to said lower bed and impinge on said baffles while falling through said channels, said catalyst beds being arranged in spaced horizontal rows so that in an intermediate row each catalyst bed is directly above and below the channel formed by the baffles covering and supporting the catalyst beds in adjacent horizontal rows, and said catalyst beds being pervious to upwardly flowing vapors which enter and leave through apertures formed by the baffles which shield the catalyst beds.

3. An apparatus in accordance with claim 2 in which the baffles covering each catalyst bed have an inverted V-shape.

4. An apparatus according to claim 1 wherein the catalyst beds are in a staggered arrangement.

References Cited in the file of this patent

UNITED STATES PATENTS

| Number | Name | Date |
| --- | --- | --- |
| 1,515,299 | Downs et al. | Nov. 11, 1924 |
| 2,270,360 | Vorhees | Jan. 20, 1942 |
| 2,280,928 | Pie | Apr. 28, 1942 |
| 2,319,452 | Grosse | May 18, 1943 |
| 2,398,954 | Odell | Apr. 23, 1946 |
| 2,462,413 | Meath | Feb. 22, 1949 |
| 2,606,097 | Goodson et al. | Aug. 5, 1952 |
| 2,639,973 | Fritz | May 26, 1953 |
| 2,662,003 | Waddill | Dec. 1, 1953 |
| 2,682,560 | Carter | June 29, 1954 |
| 2,752,363 | Drummond | June 26, 1956 |
| 2,872,472 | Fenske et al. | Feb. 3, 1959 |
| 2,884,373 | Bailey | Apr. 28, 1959 |
| 2,893,849 | Krebs | July 7, 1959 |

FOREIGN PATENTS

| Number | Country | Date |
| --- | --- | --- |
| 937,103 | Germany | Dec. 1, 1955 |